(12) United States Patent
Shankar

(10) Patent No.: US 7,447,207 B2
(45) Date of Patent: Nov. 4, 2008

(54) METHOD OF AND APPARATUS FOR TRANSPORTING SCSI DATA OVER A NETWORK

(75) Inventor: Hari Shankar, Uttar Pradesh (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 959 days.

(21) Appl. No.: 10/693,642

(22) Filed: Oct. 27, 2003

(65) Prior Publication Data
US 2005/0089032 A1 Apr. 28, 2005

(51) Int. Cl.
H04L 12/56 (2006.01)
H04L 12/66 (2006.01)
G06F 15/16 (2006.01)

(52) U.S. Cl. ............... 370/392; 370/395.6; 370/401; 370/466; 709/230

(58) Field of Classification Search ............. 370/392, 370/395.6, 401, 466; 709/230
See application file for complete search history.

(56) References Cited

U.S. PATENT DOCUMENTS

| | | | |
|---|---|---|---|
| 6,901,048 B1 * | 5/2005 | Wang et al. ............ 370/228 |
| 6,950,398 B2 * | 9/2005 | Guo et al. ............. 370/235 |
| 6,996,110 B1 * | 2/2006 | Amara et al. ........... 370/396 |
| 7,082,140 B1 * | 7/2006 | Hass .................. 370/466 |
| 7,149,217 B2 * | 12/2006 | Alexander et al. ....... 370/392 |
| 2002/0165978 A1 * | 11/2002 | Chui ................... 709/238 |
| 2003/0039246 A1 * | 2/2003 | Guo et al. ............. 370/389 |
| 2003/0058870 A1 * | 3/2003 | Mizrachi et al. ..... 370/395.52 |
| 2003/0118053 A1 * | 6/2003 | Edsall et al. ........... 370/474 |
| 2003/0231640 A1 * | 12/2003 | Basso et al. ........... 370/401 |
| 2004/0062267 A1 * | 4/2004 | Minami et al. .......... 370/463 |
| 2004/0125806 A1 * | 7/2004 | Barzilai et al. ..... 370/395.21 |
| 2005/0013295 A1 * | 1/2005 | Regan et al. ........... 370/389 |
| 2005/0036499 A1 * | 2/2005 | Dutt et al. ............ 370/401 |

* cited by examiner

*Primary Examiner*—Alpus H Hsu

(57) ABSTRACT

Encapsulated SCSI data packets in a specified format within an MPLS label are transported to a destination over a network according to the MPLS protocol. The SCSI data packets in a header structure followed by labelling according to the MPLS protocol and the labelled data packets are transported via an MPLS network. A Label Switched Path is established for the data using an MPLS routing protocol. A Channel Identifier is assigned to the data packet. The resulting data packet is labelled by an MPLS label. The labelled data packet is transported according to the MPLS protocol to the destination.

10 Claims, 6 Drawing Sheets

METHOD OF AND APPARATUS FOR TRANSPORTING SCSI DATA OVER A NETWORK

CROSS-REFERENCE TO RELATED APPLICATIONS

Not Applicable

STATEMENT REGARDING FEDERALLY FUNDED RESEARCH OR DEVELOPMENT

Not Applicable

INCORPORATION BY REFERENCE OF MATERIAL SUBMITTED ON COMPACT DISC

Not Applicable

BACKGROUND OF THE INVENTION

1. Technical Field

The present invention relates to provisioning and transporting of small computer system interface (SCSI) data over computer networks. More particularly, although not exclusively, the invention relates to improvements in SCSI data transfer using Multi Protocol Label Switching (MPLS).

2. Background Art

With the proliferation and geographical distribution of data, it is evident that the need for management of storage data and accessing volumes of data over the computer network is a key necessity for organizations which rely on or use any form of IT infrastructure.

A number of technologies such as Fibre Channel and Internet SCSI (iSCSI) attempt to address these needs, however, each of these solutions have their limitations. Fibre Channel, for example, has high Total Cost of Ownership (TCO) and requires relatively complex management. iSCSI though promises the data transfer by utilizing the legacy computer networks and thereby safeguarding this investment, suffers from Transmission Control Protocol/Internet Protocol (TCP/IP) packet processing problems on the host side and IP network problems on the network side.

The Small Computer Systems Interface (SCSI) has matured into a popular family of protocols that enables systems to communicate with I/O devices, especially storage devices. SCSI is a client-server architecture. The clients, typically Host Bus Adapters (HBAs) are called Initiators. Initiators issue SCSI commands to request services from components, logical units, of a server known as a Target. The parallel SCSI interface has a product depth and breadth that exceeds any other present I/O interface and it is supported by a wider variety of peripherals than most other types of interface. The list of supported peripherals includes tape drives, optical drives, hard disk drives, scanners, printers, disk array subsystems (RAID) and CD-ROM drives.

The Initiator-Target model was developed around bus structure model, which restricted the large physical separation of Initiators and Targets; and was suitable for accessing I/O devices connected directly (or in daisy chained configuration) to the host.

iSCSI was developed to enable block data transfers over TCP/IP Networks. As such, this technique takes advantage of the investment in legacy or existing IP networks and addresses the distance limitations of parallel SCSI. This is accomplished by using the TCP/IP protocol to transport SCSI data between SCSI nodes. However, iSCSI suffers from TCP/IP packet processing problems and IP network problems. The processing of TCP/IP packets is a CPU-intensive process, which greatly reduces the performance of other applications running on the host CPU. Further, iSCSI data transfer may suffer from network congestion and lack of QoS control functionality. This discourages use of applications that require certain or specified response time or those, which demand real-time data delivery.

Because of these limitations, iSCSI solutions are not adopted ubiquitously by organizations that need to interconnect geographically distributed data islands. There exists a need for the functionality of transporting SCSI data over the computer networks without intensive host CPU usage and load problems or congestion on the networks.

Multi Protocol Label Switching (MPLS) is growing in popularity as a set of protocols for provisioning and managing computer networks. MPLS exhibits a number of major advantages in terms of gigabit forwarding, network scaling, traffic engineering and Quality of Service (QoS). MPLS overlays an Internet Protocol (IP) network to allow resources to be reserved and routes pre-determined. Effectively, MPLS superimposes a connection-oriented framework over the connectionless IP network. It thus provides virtual links or tunnels through the network to connect nodes that lie at the edge of the network.

For data transfers which are sensitive to delays and disruptions; high levels of reliability, availability coupled with the ease of maintenance of networks is required. Also in the case of large amounts of mission critical data or applications which require a certain or specified response time, a reasonable amount of bandwidth may be required to avoid traffic congestion.

The present invention overcomes or reduces the aforementioned limitations and provides a communication method for carrying SCSI commands and data over the network with minimum congestion, high reliability, low latency and minimum host CPU usage.

SUMMARY OF THE INVENTION

In its broadest aspect, the invention provides a method of transporting SCSI data packets over a network, the method including the steps of encapsulating a SCSI data packet within an MPLS header structure, said structure including a MPLS label, wherein data packet is assigned to a forward equivalence class; and transporting the labelled data packet, according to the MPLS protocol, to its destination.

In a preferred embodiment, the invention provides a method of transporting SCSI data packets over a network, the method including the steps of encapsulating a SCSI data packet within an header structure, thereby forming a mSCSI protocol data unit (mSCSI PDU);

assigning the mSCSI PDU to a forward equivalence class;

labelling the mSCSI PDU according to the MPLS protocol; and transporting the labelled data packet, according to the MPLS protocol, to its destination.

In a preferred embodiment, the method of transporting SCSI data packets over a network includes the steps of:

encapsulating the SCSI data packet within an mSCSI header thus forming an mSCSI protocol data unit (mSCSI PDU);

establishing a Label Switched Path for the mSCSI PDU using an MPLS routing protocol;

assigning the mSCSI PDU to a forward equivalence class;
labelling the mSCSI protocol data unit with an MPLS label to form an MPLS data packet;
transporting the labelled data packet, according to the MPLS protocol, to its destination.

In an alternative embodiment the invention provides a method of transporting iSCSI protocol data units over a network, the method including the steps of:
assigning a iSCSI protocol data unit to a forward equivalence class;
labelling the iSCSI protocol data unit according to the MPLS protocol and
transporting it on an MPLS network core.

The Label Switched Path specifies the routing that is to be imposed on the data packets when carried on the MPLS network.

Preferably the MPLS routing protocol is CR-LDP, RSVP-TE or similar.

In an alternative embodiment, the invention provides a method for transporting iSCSI protocol data units (iSCSI PDUs) over an MPLS network including the steps of:
establishing a label switched path for an iSCSI PDU using an MPLS routing protocol;
assigning the iSCSI PDU to a particular forward equivalence class;
labelling the iSCSI protocol data unit with an MPLS label to form a MPLS data packet;
transporting the labelled data packet according to the MPLS protocol.

BRIEF DESCRIPTION OF THE DRAWINGS

The present invention will now be described by way of example only and with reference to the drawings in which.

DETAILED DESCRIPTION OF THE DRAWING

Multi protocol Label Switching (MPLS) is a standards-approved technology for speeding up network traffic flow and making it easier to manage computer networks. MPLS essentially involves setting up a specific path for a given sequence of packets, where a label inserted into each packet identifies the path or route. This saves the time needed for a router handling the MPLS packet to look up the address of the next node to which the packet is to be forwarded.

With reference to the standard (OSI) model for a network, MPLS allows most packets to be forwarded at layer2 (switching) level rather than at the layer3 (routing) level. In addition to moving traffic faster overall, MPLS makes it easy to manage a network for Quality of Service.

To assist in the following description, some terminology used in MPLS is defined as follows:
a. Label Edge Routers (LER): These map IP traffic to/from MPLS label packets and push and pop labels.
b. Label Switching Routers (LSR): swap labels and forward MPLS packets.
c. Forward Equivalence Class (FEC): policy for assigning labels.
d. Label Switched Path (LSP): a logical connection, typically multi-point to point (if signalled according to a Label Distribution Protocol) or point-to-point, that forwards MPLS labelled packets.
e. Label Distribution Protocol (LDP): a protocol that establishes labels used to identify MPLS traffic.

Figure 1:
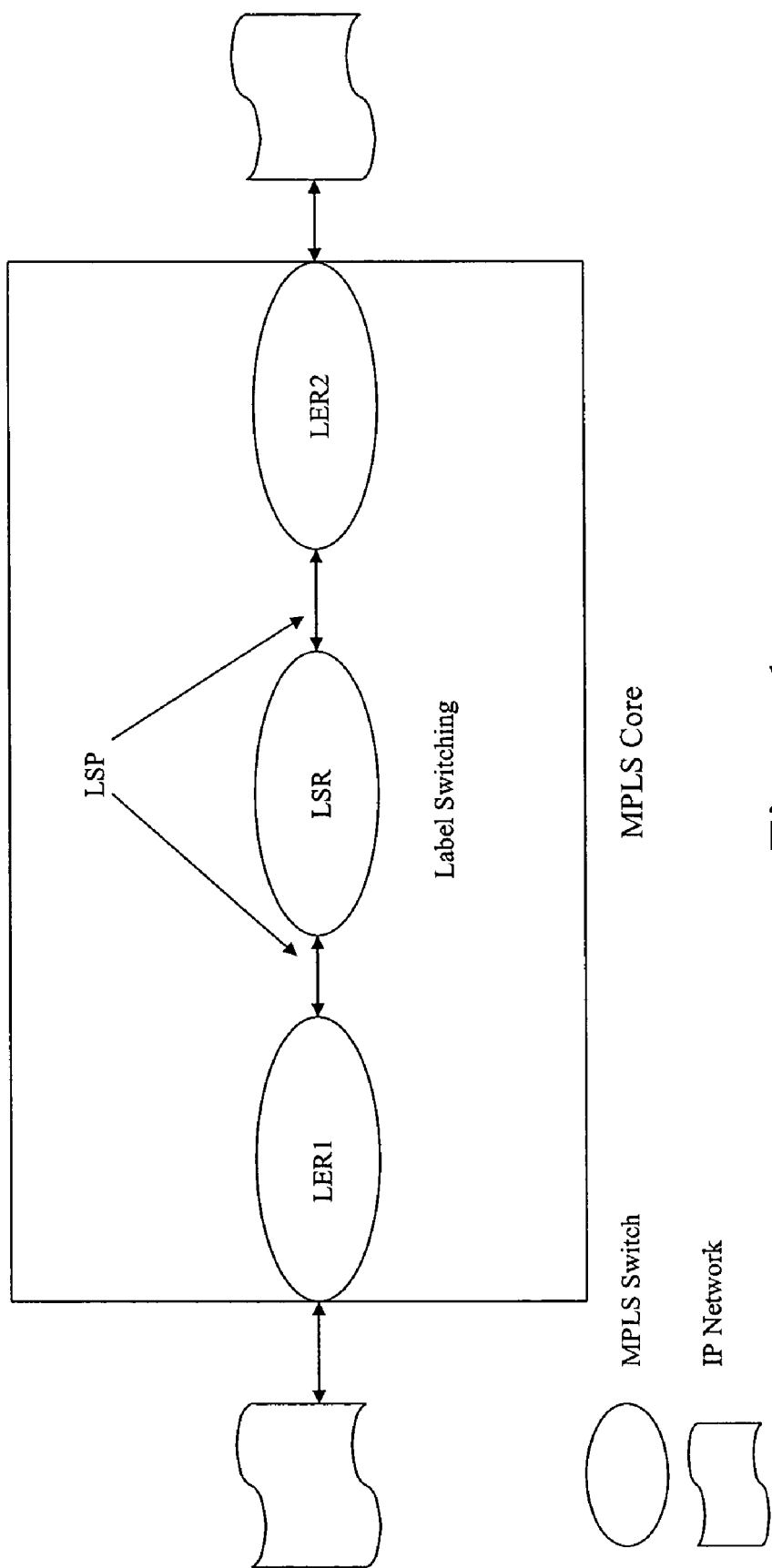
FIG. 1 is an illustration of packet flow in a Multi Protocol Label Switching environment.

FIG. 1 is a highly simplified network topology diagram with MPLS in the network core. An IP packet enters the ingress router LER1 (Label Edge Router) from the IP network. Router LER1 processes the packet to determine the Forward Equivalence Class (FEC) of the packet. This assignment of a particular packet to a particular FEC is encoded as a short fixed length value known as label. On identifying the packet with a particular FEC, LER1 uses FEC to Next Hop Label Forwarding Entry (NHLFE) map to forward the packet to a first LSR (the only LSR shown in FIG. 1 to simplify the drawing). The NHLFE is established using Label Distribution Protocol (LDP). The LSR analyzes the label and uses an Incoming Label Map (ILM) to map this label to a NHFLE. Using this information the first LSR swaps the label and forwards the packet to the next LSR.

All the subsequent LSR's that lie along the LSP receive the packet, read the label on the packet, replace it with a new one (i.e.; perform label swapping) and forward the packet to another LSR. Eventually the packet reaches the egress router (LER2), which strips off the label and hands over the packet to the original network.

All of the MPLS labelling/processing of the data packet is local to the MPLS core while the end nodes from where the TCP/IP packet has originated or where the TCP/IP packet is destined are not aware of MPLS core.

The data packet, which emerges from the MPLS core is a pure IP packet and is carried forward by the IP network to its final destination.

The present invention introduces two new terms, mSCSI and miSCSI. mSCSI is a method of carrying SCSI data over an MPLS network or in an MPLS environment that overlays an IP network. miSCSI is a method of carrying SCSI data over an IP network that overlays an MPLS network or environment. In both the mSCSI and miSCSI methods, resources are reserved and routes are established prior to transmission of the SCSI data. Although a specific embodiment of the mSCSI method is described, the claims are to be interpreted to cover other ways of and arrangements for carrying SCSI data over an MPLS network or in an MPLS environment that overlays an IP network, wherein, prior to transmission of the SCSI data, resources are reserved and routes are established. Also, although a specific embodiment of the miSCSI method is described, the claims are to be interpreted to cover other ways and arrangements for carrying SCSI data over an IP network that that overlays an MPLS network or environment, wherein, prior to transmission of the SCSI data, resources are reserved and routes are established.

In the disclosed mSCSI embodiment, MPLS establishes label-switched paths that provide virtual links or paths through the network to connect SCSI nodes that lie at the edges of the network.

According to this embodiment, the protocol stack includes what are known as mSCSI data encapsulated in the MPLS header protocol structure on top of an MPLS transport arrangement.

Two types of mSCSI sub-frames are defined, Data and Control. The Data and Control mSCSI sub-frames are exchanged between an Initiator and Target. Data sub-frames include SCSI data to be exchanged between Initiator and Target, while the Control sub-frames include SCSI commands and responses to be carried between the Initiator and Target.

An mSCSI frame broadly includes a SCSI payload with an mSCSI header. The mSCSI header is applied to the SCSI payload and includes information about the SCSI payload for the purposes of error recovery, where required. The mSCSI encapsulated SCSI payload is referred to as an mSCSI protocol data unit, or mSCSI PDU; PDU is used as an acronym for protocol data unit.

Figure 6:
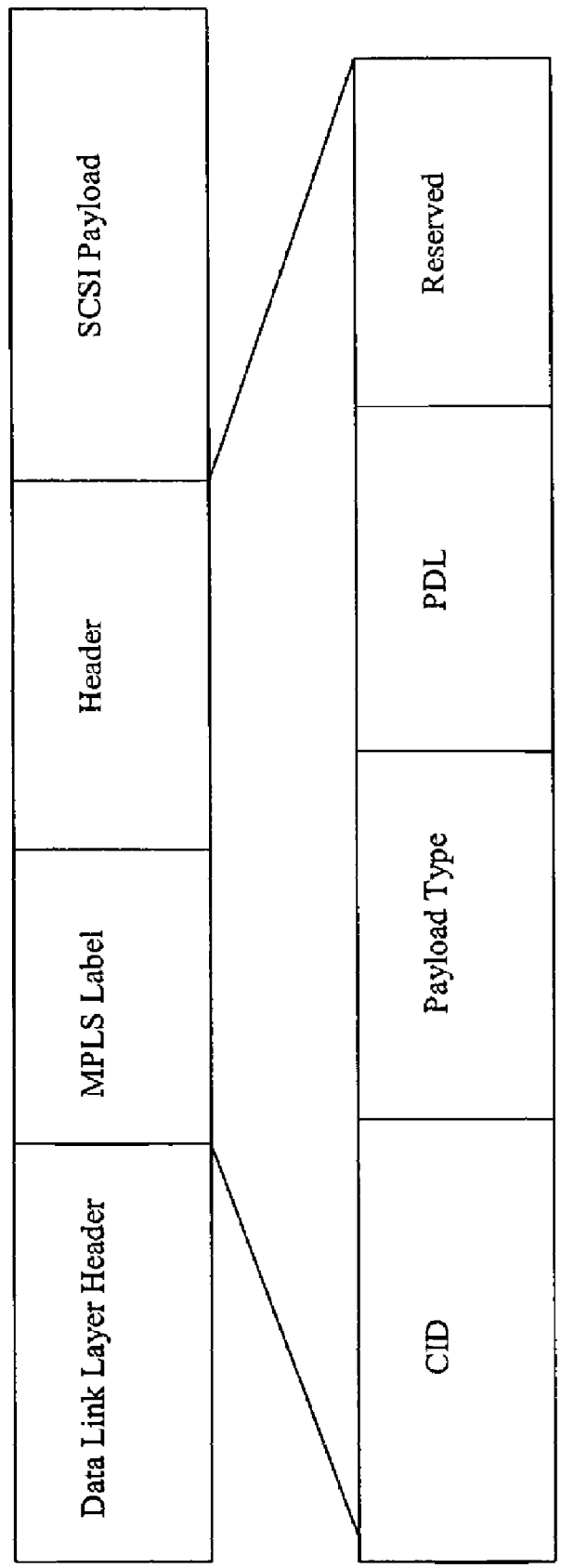
FIG. 6 is an illustration of the structure of a mSCSI frame.

FIG. 6 shows, in detail, the packet format of an mSCSI frame in the MPLS environment. The MPLS header corresponds to a 32 bit MPLS shim header (see FIG. 4) which contains (from left to right) the 20-bit label field carrying the actual value of the MPLS label, the class of service (CoS) field, which is used to control queuing and discard algorithms that are applied to the packet as it is transmitted through the network, and a single bit stack field that supports a hierarchical label stack.

In addition an eight bit time-to-live (TTL) field that provides conventional IP TTL functionality is included as part of MPLS header.

The 32 bit mSCSI header (see FIG. 6) has the following fields:

a. CID: The channel identifier identifies uniquely an Initiator/Target connection (I/T nexus) within the Label Switched Path. This field is used to multiplex the mSCSI frames and its discussion is outside the scope of the present description.
b. Payload Type: This field identifies whether the SCSI payload carries a command/response or data.
c. Payload Length: This field indicates the number of SCSI words (32 bits) in the SCSI payload including the PAD octets.
d. PDL: This field indicates the number of PAD octets in the last word of the SCSI payload.
e. Reserved: This is a reserved field and can be utilized depending upon the specific implementation.

Thus, the data frame in FIG. 6 includes the SCSI payload encapsulated in an mSCSI header, which in turn is encapsulated in a data link layer header which, when carried by the MPLS network, carries an MPLS label embedded in an MPLS header.

Figure 5:
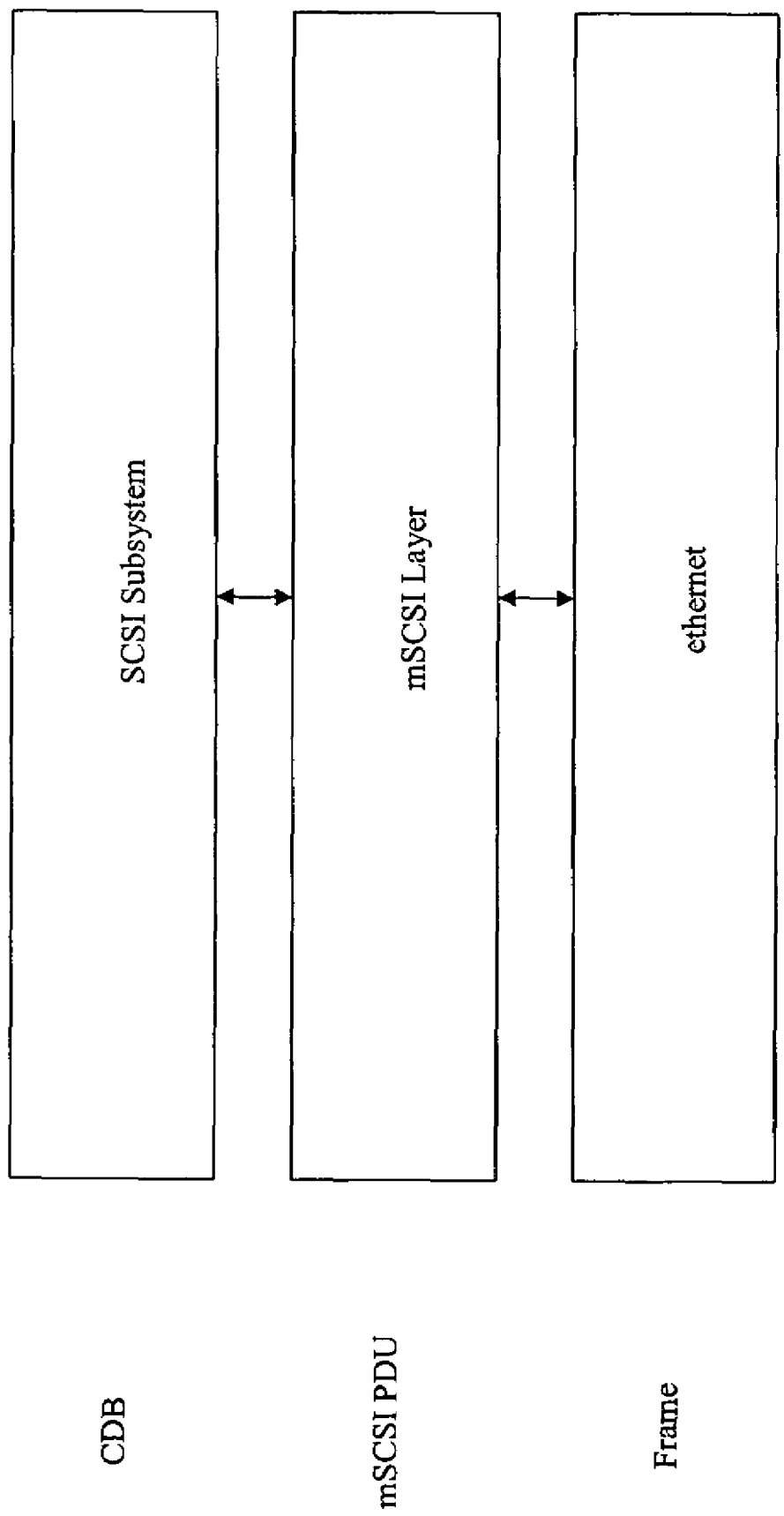
FIG. 5 is an illustration of the flow of data packets in a mSCSI embodiment.

FIG. 5 is an illustration of a typical flow of a data packet on the host side from a SCSI subsystem to the physical network. The strings at the left of each layer denote the name of data packet as it passes down the stack.

The flow of data is describes as follows:

a. the SCSI layer builds/receives SCSI Command descriptor blocks (CDBs) and passes/receives them with command parameters to/from:
b the mSCSI layer that build/receives mSCSI Protocol Data Units and relays/receives them to/from:
c. the Ethernet layer which encapsulates/strips the data link layer and relays/receives the data packet to/from the MPLS network.

The mSCSI layer is part of the OS kernel and is responsible for error recovery policies and for building the mSCSI PDUs.

This implementation is free from TCP/IP packet processing and relies completely on the MPLS network for transport of data. This implementation provides a highly reliable, efficient and scalable solution for carrying SCSI data between remote SCSI nodes.

According to the present embodiment, in order to establish an LSP between the Initiator and the Target, the following steps are followed:

a. An LSP is created by using a MPLS routing protocol (CR-LDP or RSVP-TE).
b. A channel identifier is assigned to an incoming SCSI data packet and is a part of the 4-byte MPLS header which encapsulates the SCSI payload. The header is fixed in size while SCSI payload size can vary.

Label Edge Router, LER1 (FIG. 1) transmits an MPLS labelled packet to a Label Switched Router (LSR), which is a part of pre-established Label Switched Path. The LSRs switch the packets according to the labels. Thus, when a data packet reaches an LSR, the router reads the label on each packet, replaces it with a new packet as listed in the forwarding table of the packet and then forwards the new packet to the next LSR (or LER2).

The action is repeated at each LSR until the data packet reaches LER2 (FIG. 1). LER2 acts as an egress router for the MPLS core.

The egress router strips the data packet off the MPLS label and hands over the mSCSI data to the mSCSI layer via the Ethernet layer. The mSCSI layer analyzes the packet, and performs further processing related to error detection/recovery and hands over the CDB to the SCSI I/O subsystem.

Thus, SCSI data is transported from one SCSI subsystem to other SCSI subsystem, over the MPLS network.

This arrangement solves the problem of network congestion, high bandwidth requirements and scalability that arises due to carrying of bulk storage data over long period of times on the network. It also addresses the issues of host CPU performance degradation due to TCP/IP packet processing.

The miSCSI embodiment may not specifically address improvements in host CPU performance and Quality of Service in carrying data, but provides the advantages of MPLS for data transport in the network core.

In this embodiment, the typical protocol stack includes SCSI data encapsulated in an IP layer protocol followed by labelling by the MPLS protocol. This configuration has the advantage of MPLS while carrying the data packets in the network core. However TCP packet processing will be required at the end nodes for reliable transmission. This may impact the host CPU performance as host CPU cycles may be expended for processing TCP/IP packets.

Figure 2:
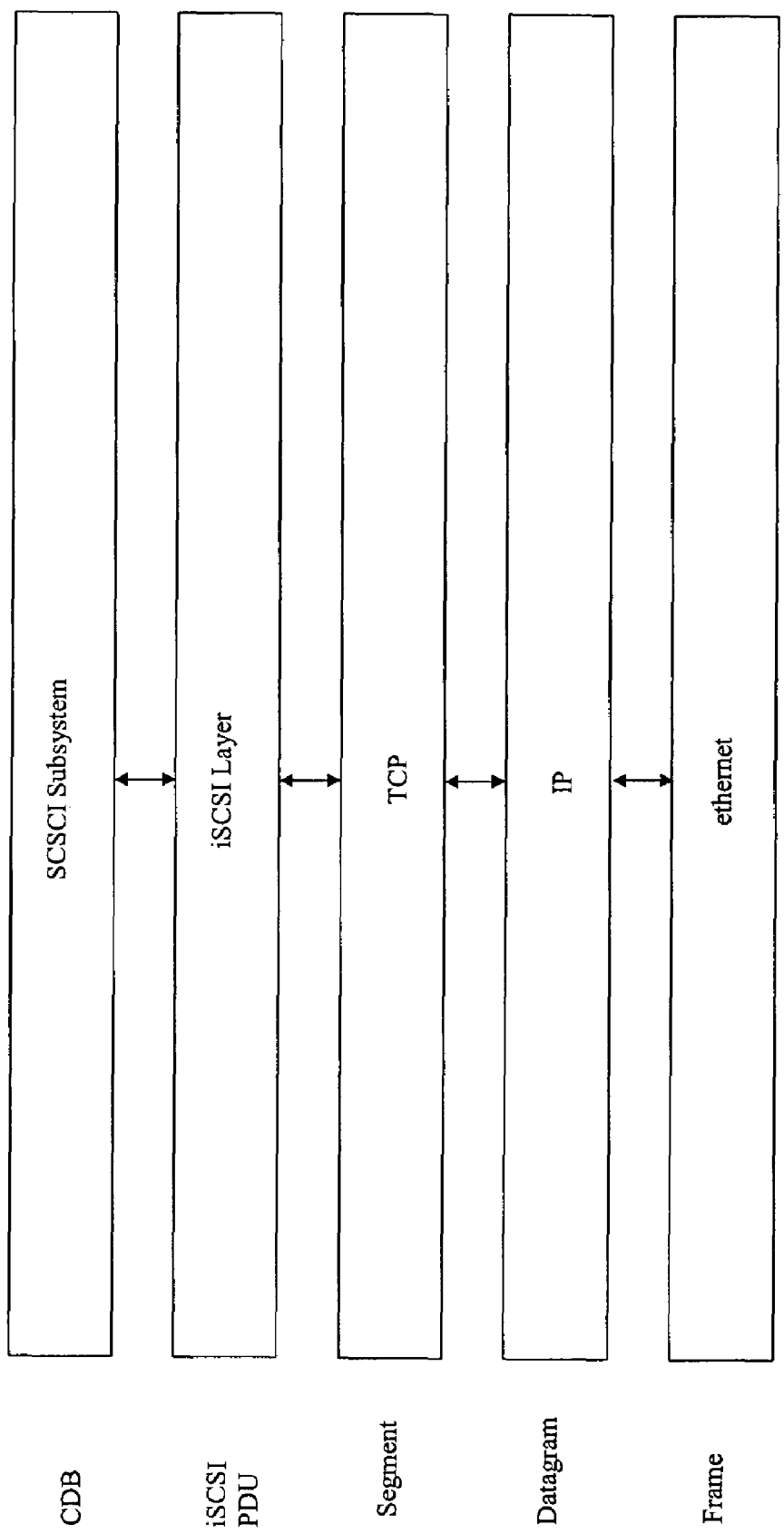
FIG. 2 is an illustration of data packet flow in a miSCSI embodiment.

FIG. 2 is an illustration of a typical flow of data packet on the host side from the SCSI subsystem to the physical network. The strings at the left of each layer denote the name of data packet as the data packet passes down the stack.

a. the SCSI subsystem layer builds/receives SCSI Command descriptor blocks (CDBs) and passes/receives them with the command parameters to/from:
b. the iSCSI layer that build/receives iSCSI Protocol Data Units (PDUs) and relays/receives them to/from one or more TCP connections. This PDU is sent down/up to/from:
c. the IP layer which encapsulates/strips the IP header and relays/receives to/from:
d. the Ethernet layer which encapsulates/strips the data link layer and relays/receives the data packet on/from the physical network.

Because the iSCSI PDUs are not aware of the MPLS in the core, the MPLS in the core is not shown. Any changes in the format of the iSCSI packets while entering the MPLS core are of local significance only and the egress router of the MPLS core strips off the MPLS label before handing over the packet to the original network.

Thus, from the point of view of the IP router, the packet that emerges from the MPLS core is another IP packet, and the IP router tries to deliver the packet to the destination by utilizing its best effort methods.

Figure 3:
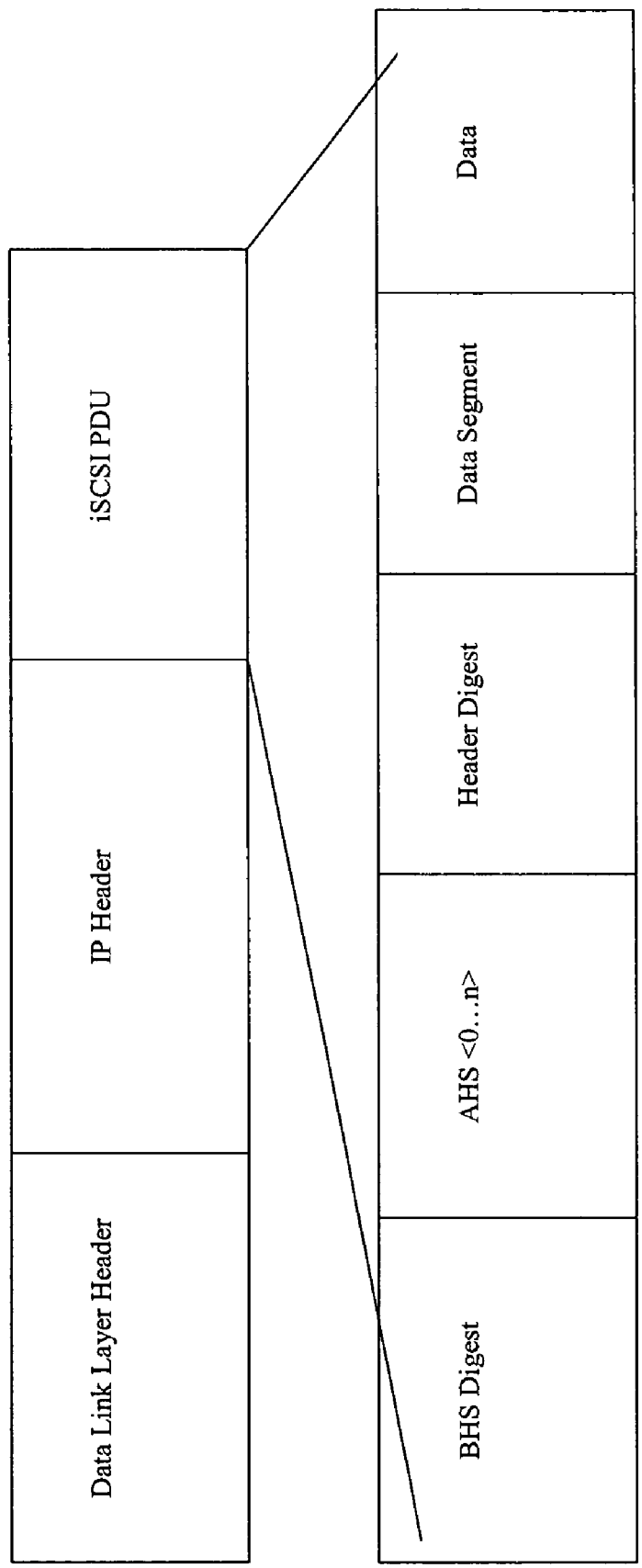
FIG. 3 is an illustration of an iSCSI packet while being transported in an IP network.

FIG. 3 is an illustration of a data packet structure that is transmitted on the IP network with details of the iSCSI protocol data shown expanded.

Figure 4:
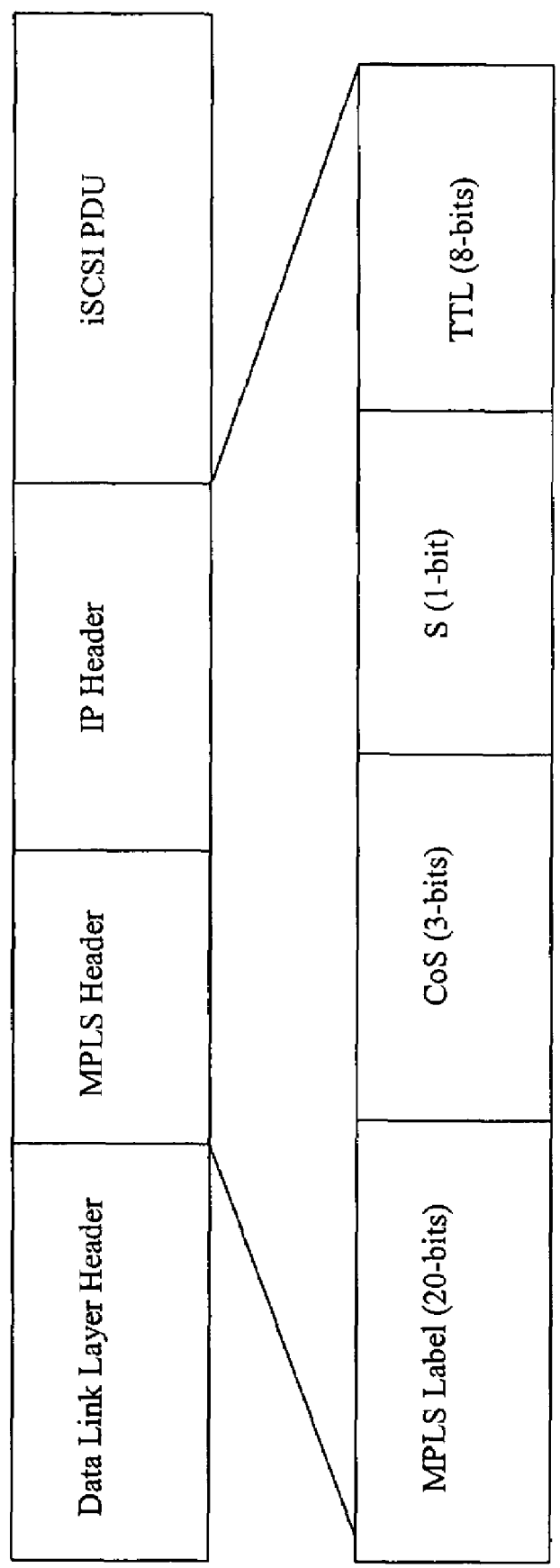
FIG. 4 is an illustration of an iSCSI packet inside an MPLS core.

This data packet on reaching the MPLS core enters LER1 (See FIG. 1) and is analyzed and identified with, or assigned to, a Forward Equivalence Class (FEC). An MPLS label is put between the data link layer header and IP layer header (as is shown in FIG. 4.). If the Data Link layer protocol supports a label field, then the corresponding label field encapsulates the MPLS label. However if the Data link layer protocol does not support a label field, the MPLS label is encapsulated in a standardized MPLS header that is inserted between the Data link layer header and IP header.

The advantage of MPLS is that it permits any link layer technology to carry an MPLS labelled packet so that it can benefit from label switching across an LSP.

FIG. 4 shows the structure of an iSCSI data packet once it has entered the MPLS core. The 32 bit MPLS shim header contains (from left to right) the 20-bit label field carrying the actual value of the MPLS label, the class of service (CoS) field, which can be used to control queuing and discard algorithms that are applied to the packet as it is transmitted through the network, and a single bit stack field that supports a hierarchical label stack.

In addition an eight bit time-to-live (TTL) field that provides conventional IP TTL functionality is included as part of MPLS header.

After labelling the incoming data packet, LER1 forwards the labelled packet to LSRs in the MPLS core. The LSRs, which fall along the pre-established LSP, switches the packets according to the labels. That is, when a data packet reaches a LSR, the LSR analyzes the label and uses ILM to map this label to a NHFLE. Using this mapping information the LSR swaps the label and forwards the packet to the next LSR (or LER2). The action is repeated at each LSR until the data packet reaches LER2. LER2 acts as an egress router from the MPLS core and strips the MPLS label off the data packet and hands over the packet to the IP network which carries the packet to its final destination.

The performance of applications or network use for long periods with demanding bandwidths can be significantly improved with the miSCSI arrangement. As noted above, even though the end iSCSI nodes are not aware of the miSCSI arrangement, considerable gains can be obtained in respect of network performance.

This embodiment may however suffer from TCP/IP packet processing problems and lack of QoS. However, this embodiment aims at providing an miSCSI solution without many changes in the iSCSI method. This can co-exist with current iSCSI implementations and address some of the IP network problems.

Although the invention has been described by way of example and with reference to particular embodiments it is to be understood that modification and/or improvements may be made without departing from the scope of the appended claims.

Wherein the foregoing description reference has been made to integers or elements having known equivalents, then such equivalents are herein incorporated as if individually set forth.

The invention claimed is:

1. A method of transporting small computer system interface (SCSI) data packets over a network to a destination (mSCSI), the method including the steps of:

encapsulating a SCSI data packet within a Multi Protocol Label Switching (MPLS) header structure, said structure including a MPLS label;

assigning the data packet to a forward equivalence class; and transporting the labeled data packet, according to an established, MPLS protocol, to its destination.

2. A method as claimed in claim 1 including the step of establishing a Label Switched Path for an mSCSI PDU using an MPLS routing protocol prior to assigning the mSCSI PDU to a forward equivalence class.

3. A method of transporting small computer system interface (SCSI) data packets over a network to a destination (mSCSI), the method including the steps of:

encapsulating a SCSI data packet within a Multi Protocol Label Switching (MPLS) header structure, forming an mSCSI protocol data unit (mSCSI PDU);

assigning the mSCSI PDU to a forward equivalence class;

labeling the mSCSI PDU according to the an established MPLS protocol; and transporting the labeled data packet, according to the MPLS protocol, to its destination.

4. A method as claimed in claim 3 including the step of establishing a Label Switched Path for the mSCSI PDU using an MPLS routing protocol prior to assigning the mSCSI PDU to a forward equivalence class.

5. A method as claimed in claim 4 wherein the Label Switched Path specifies the routing that is to be imposed on the data packets when carried on the MPLS network.

6. A method as claimed in claim 4 wherein routing protocol for the MPLS network is selected from the group including constraint-based Label Distribution Protocol (CR-LDP) and Resource Reservation Protocol-traffic extension (RSVP-TE).

7. A method of transporting Internet Small Computer System interface (iSCSI) protocol data units over a network to a destination, the method including the steps of:

assigning an iSCSI protocol data unit to a forward equivalence class;

labeling the iSCSI protocol data unit according to an established Multi Protocol Label Switching (MPLS) protocol; and transporting the labeled iSCSI protocol data unit on an MPLS network core.

8. A method of transporting Internet Small Computer System Interface (iSCSI) protocol data units (PDUs) over a Multi Protocol Label Switching (MPLS) network including the steps of:

establishing a label switched pan for an iSCSI PDU using an MPLS routing protocol;

assigning the iSCSI PDU to a particular forward equivalence class;

labeling the iSCSI PDU with an MPLS label to form an MPLS data packet; and transporting the labeled data packet according to the an established MPLS protocol.

9. A method as claimed in claim 8 wherein the Label Switched Path specifies the routing that is to be imposed on the data packets when carried on the MPLS network.

10. A method as claimed in claim 8 wherein the MPLS routing protocol is constraint-based Label Distribution Protocol (CR- LDP), or Resource Reservation Protocol-traffic extension (RSVP-TE).

* * * * *

UNITED STATES PATENT AND TRADEMARK OFFICE
CERTIFICATE OF CORRECTION

| | | |
|---|---|---|
| PATENT NO. | : 7,447,207 B2 | Page 1 of 1 |
| APPLICATION NO. | : 10/693642 | |
| DATED | : November 4, 2008 | |
| INVENTOR(S) | : Hari Shankar | |

It is certified that error appears in the above-identified patent and that said Letters Patent is hereby corrected as shown below:

In column 8, lines 6-7, in Claim 1, after "established" delete ",".

In column 8, line 49, in Claim 8, delete "pan" and insert -- path --, therefor.

Signed and Sealed this

Twenty-sixth Day of May, 2009

JOHN DOLL
*Acting Director of the United States Patent and Trademark Office*